(12) United States Patent        (10) Patent No.:     US 9,618,779 B2
     Xu                          (45) Date of Patent:     Apr. 11, 2017

(54) LCD VIEWING ANGLE CONTROL METHOD, LCD PANEL AND LCD

(71) Applicant: BOE TECHNOLOGY GROUP CO., LTD., Beijing (CN)

(72) Inventor: Xiaoling Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 15 days.

(21) Appl. No.: 14/123,609

(22) PCT Filed: Nov. 16, 2012

(86) PCT No.: PCT/CN2012/084163
§ 371 (c)(1),
(2) Date: Dec. 3, 2013

(87) PCT Pub. No.: WO2013/177902
PCT Pub. Date: Dec. 5, 2013

(65) Prior Publication Data
US 2014/0184965 A1    Jul. 3, 2014

(30) Foreign Application Priority Data
Jun. 1, 2012  (CN) .......................... 2012 1 0180256

(51) Int. Cl.
*G02F 1/13* (2006.01)
*G02F 1/133* (2006.01)
(Continued)

(52) U.S. Cl.
CPC ........ *G02F 1/1323* (2013.01); *G02F 1/13306* (2013.01); *G02F 1/134363* (2013.01);
(Continued)

(58) Field of Classification Search
CPC ........... G09G 2310/00; G09G 2310/02; G09G 2310/0202; G09G 2310/0205;
(Continued)

(56) References Cited

U.S. PATENT DOCUMENTS 6,642,984 B1 * 11/2003 Yoshida et al. ............... 349/139
7,667,808 B2 *  2/2010 Yamashita ........ G02F 1/134363
                                                    349/139
(Continued)

FOREIGN PATENT DOCUMENTS

CN         1991466 A    7/2007
CN       101738792 A    6/2010
(Continued)

OTHER PUBLICATIONS

English translation of CN 102012587 A, Title: Homeotropic alignment fast response FIS-VA-3T liquid crystal display, Author: Sun Y et al.; Date of publication: Apr. 13, 2011.*

(Continued)

*Primary Examiner* — Dung Nguyen
*Assistant Examiner* — Shan Liu
(74) *Attorney, Agent, or Firm* — Ladas & Parry LLP

(57) ABSTRACT

A liquid crystal display (LCD) viewing angle control method, an LCD panel and an LCD are disclosed. The method is applied in the LCD panel comprising an array substrate and a color filter substrate which are arranged opposite to each other. The method comprises the following steps of: arranging a first planar transparent electrode (13) in the color filter substrate of the LCD panel and a second strip transparent electrode (17) in the array substrate of the LCD panel, and forming a fringe electric field between the array substrate and the color filter substrate through the first planar transparent electrode (13) and the second strip transparent electrode (17); and controlling the display viewing angle of (Continued)

the LCD panel by controlling the formed fringe electric field. Moreover, the method can achieve a simple production process of the LCD panel.

15 Claims, 6 Drawing Sheets

(51) Int. Cl.
*G02F 1/1343* (2006.01)
*G09G 3/36* (2006.01)

(52) U.S. Cl.
CPC ... *G02F 2001/134372* (2013.01); *G09G 3/36* (2013.01); *G09G 2320/068* (2013.01)

(58) Field of Classification Search
CPC ..... G09G 2310/0208; G09G 2310/021; G09G 2310/0213; G09G 2310/0216; G09G 2310/0218; G09G 2310/0221; G09G 2310/0224; G09G 2310/0227; G09G 2310/0229; G09G 2310/0232; G09G 2310/0235; G09G 2310/0237; G09G 2310/024; G09G 2310/0243; G09G 2310/0245; G09G 2310/0248; G09G 2310/0251; G09G 2310/0254; G09G 2310/0256; G09G 2310/0259; G09G 2310/0262; G09G 2310/0264; G09G 2310/027; G09G 2310/0272; G09G 2310/0278; G09G 2310/0281; G09G 2310/0283; G09G 2310/0286; G09G 2310/0289; G09G 2310/0291; G09G 2310/0294; G09G 2310/0297; G09G 2310/04; G09G 2310/06; G09G 2310/061; G09G 2310/062; G09G 2310/063

See application file for complete search history.

(56) References Cited

U.S. PATENT DOCUMENTS

| 2004/0207594 A1* | 10/2004 | Kubo | G02F 1/1323 345/100 |
| 2006/0267905 A1* | 11/2006 | Nishino et al. | 345/98 |
| 2007/0040780 A1* | 2/2007 | Gass | G02F 1/134363 345/87 |
| 2008/0180377 A1* | 7/2008 | Meng | G02F 1/1323 345/94 |
| 2010/0128189 A1* | 5/2010 | Teranishi et al. | 349/33 |
| 2010/0197189 A1* | 8/2010 | Jin | G02F 1/133514 445/46 |

FOREIGN PATENT DOCUMENTS

| CN | 102012587 A | * | 4/2011 |
| KR | 20090128927 A | | 12/2009 |

OTHER PUBLICATIONS

International Search Report for International Application No. PCT/CN2012/084163, 14pgs.
First Office Action issued by the Chinese Patent Office for Chinese Patent Application No. 2012101802566 issued Jun. 24, 2014, 11pgs.
English translation of First Office Action issued by the Chinese Patent Office for Chinese Patent Application No. 2012101802566 issued Jun. 24, 2014, 11pgs.
International Preliminary Report on Patentability (in English) issued by the International Bureau of WIPO on Dec. 2, 2014 for International Application No. PCT/CN2012/084163, 11 pages.
Second Office Action (Chinese language) issued by the State Intellectual Property Office ("SIPO") on Dec. 4, 2014 for International Application No. 201210180256.6, 9 pages.
English translation of second Office Action (listed above), issued by SIPO for International Application No. 201210180256.6, 12 pages.

* cited by examiner

LCD VIEWING ANGLE CONTROL METHOD, LCD PANEL AND LCD

CROSS REFERENCE TO RELATED APPLICATIONS

This application is based on International Application No. PCT/CN2012/084163 filed on Nov. 6, 2012, which claims priority to Chinese National Application No. 201210180256.6 filed on Jun. 1, 2012, the contents of which are incorporated herein by reference.

TECHNICAL FIELD

Embodiments of the present invention relate to a liquid crystal display (LCD) viewing angle control method, an LCD panel, and an LCD.

BACKGROUND

With the wide application of LCDs in lives and work, people's requirements on the viewing angle of an LCD become higher and higher. For example, when a person uses a notebook computer in a public place, a smaller viewing angle of a screen is required for privacy protection; and when more than one person use a desktop or notebook computer to watch video at home, a larger viewing angle of the screen is required for the convenience of the use of more than one person.

Based on the requirements, a viewing angle controllable display mode is provided in prior art. For example, a plurality of liquid crystal layers are configured to achieve viewing angle control, in which one layer is configured to achieve gray-scale control and the other layer is configured to achieve viewing angle control. For example, a double backlight system method is applied, in which one backlight system is for wide viewing angle display and the other backlight system is for narrow viewing angle display. However, these methods increase the number of the liquid crystal layers or the number of the backlight systems, and hence increase the volume of liquid crystal screens and have complex production processes and high costs.

SUMMARY

The embodiments of the present invention provide an LCD viewing angle control method, an LCD panel and an LCD, which are used for solving the problem of the complex production processes of viewing angle controllable displays in prior art.

An aspect of the present invention provides an LCD viewing angle control method, applied in an LCD panel comprising an array substrate and a color filter substrate which are arranged opposite to each other. The method comprises: arranging a first planar transparent electrode in the color filter substrate of the LCD panel and a second strip transparent electrode in the array substrate of the LCD panel, and forming a fringe electric field between the array substrate and the color filter substrate through the first planar transparent electrode and the second strip transparent electrode; and controlling the display viewing angle of the LCD panel by controlling the formed fringe electric field.

In the method, for instance, a pixel electrode voltage is applied to the second strip transparent electrode, and controlling of the display viewing angle of the LCD panel by controlling the formed fringe electric field further comprises: applying a bias voltage to the first planar transparent electrode and adjusting the display viewing angle of the LCD panel by adjusting the bias voltage, and the display viewing angle of the LCD panel becomes narrower as the bias voltage is increased.

In the method, for instance, a fourth planar transparent electrode is further arranged between a transparent substrate of the array substrate and the second strip transparent electrode; and an insulating layer is arranged between the fourth planar transparent electrode and the second strip transparent electrode, and when the LCD panel is restored from a bright state to a dark state, a short-time voltage is applied for a predetermined duration to the fourth planar transparent electrode to make liquid crystal molecules quickly restored to a vertical state, otherwise a voltage of 0V or no voltage is applied to the fourth planar transparent electrode.

In the method, for instance, a third strip transparent electrode is further arranged between the transparent substrate of the array substrate and the second strip transparent electrode, and an insulating layer is arranged between the second strip transparent electrode and the third strip transparent electrode.

In the method, a pixel electrode voltage is applied to the second strip transparent electrode, and a common electrode voltage is applied to the third strip transparent electrode; and controlling of the display viewing angle of the LCD panel by controlling the formed fringe electric field further comprises: applying a bias voltage to the first planar transparent electrode and adjusting the display viewing angle of the LCD panel by adjusting the bias voltage, and the display viewing angle of the LCD panel becomes narrower as the bias voltage is increased.

In the method, a fourth planar transparent electrode is further arranged between the transparent substrate of the array substrate and the third strip transparent electrode, and an insulating layer is arranged between the fourth planar transparent electrode and the third strip transparent electrode, and when the LCD panel is restored from a bright state to a dark state, a short-time voltage is applied for a predetermined duration to the fourth planar transparent electrode to make liquid crystal molecules quickly restored to a vertical state, otherwise a voltage of 0V or no voltage is applied to the fourth planar transparent electrode.

In the LCD viewing angle control method provided by an embodiment of the present invention, electrodes are respectively arranged on the color filter substrate and the array substrate, and the viewing angle of the LCD panel become controllable under the control of the fringe field effect between the electrodes, so that a viewing angle control method allowing for a simple production process for the LCD can be provided.

Another aspect of the present invention further provides an LCD comprising an array substrate and a color filter substrate which are arranged opposite to each other, the color filter substrate comprises a first transparent substrate and a color filter formed on the first transparent substrate; the array substrate comprises a second transparent substrate; and a first planar transparent electrode is arranged on the color filter of the color filter substrate, and a second strip transparent electrode is arranged on the second transparent substrate of the array substrate, and the second strip transparent electrode is configured to apply a pixel electrode voltage and the first planar transparent electrode is configured to apply a bias voltage, whereby the LCD panel achieves image display at different viewing angle ranges under the control of the bias voltage.

In the LCD panel, for instance, a liquid crystal layer is arranged between the array substrate and the color filter substrate; and liquid crystals in the liquid crystal layer are positive liquid crystals that are vertically arranged in the case of no voltage applied.

In the LCD panel, for instance, a third strip transparent electrode is further arranged between the second strip transparent electrode and the second transparent substrate of the array substrate; the second strip transparent electrode and the third strip transparent are arranged in an interleave manner and isolated by an insulating layer; and the third strip transparent electrode is configured to apply a common electrode voltage.

In the LCD panel, for instance, a fourth planar transparent electrode is further arranged between the second transparent substrate and the second strip transparent electrode; and an insulating layer is arranged between the fourth planar transparent electrode and the second strip transparent electrode, and when the LCD panel is restored from a bright state to a dark state, a short-time voltage is applied for a predetermined duration to the fourth planar transparent electrode to make liquid crystal molecules quickly restored to a vertical state, otherwise a voltage of 0V or no voltage is applied to the fourth planar transparent electrode.

In the LCD panel, for instance, a fourth planar transparent electrode is further arranged between the second transparent substrate and the third strip transparent electrode; and an insulating layer is arranged between the fourth planar transparent electrode and the third strip transparent electrode, and when the LCD panel is restored from a bright state to a dark state, a short-time voltage is applied for a predetermined duration to the fourth planar transparent electrode to make liquid crystal molecules quickly restored to a vertical state, otherwise a voltage of 0V or no voltage is applied to the fourth planar transparent electrode.

In the LCD panel, for instance, the viewing angle of the LCD panel becomes narrower as the bias voltage on the first planar transparent electrode is increased.

The LCD panel of the embodiment of the present invention realizes an LCD panel with a simple structure and a changeable display viewing angle by means of the planar transparent electrode in the color filter substrate and two layers of strip transparent electrodes in the TFT array substrate. Compared with a traditional twisted nematic (TN) mode or fringe electric field switching (FFS) mode LCD panel, the LCD panel does not obviously increase its volume, has a simple production process and reduces the costs for a viewing angle controllable LCD panel.

Further another aspect of the present invention provides an LCD, which comprises the foregoing LCD panel and a drive circuit configured to drive the LCD panel in display.

In the LCD, for instance, the drive circuit is further configured to control the bias voltage applied to the first planar transparent electrode according to a predetermined condition, so as to control the mutual conversion of the LCD panel between a wide viewing angle mode and a narrow viewing angle mode.

In the LCD, for instance, the bias voltage is applied to the first planar transparent electrode of the LCD panel when the drive circuit actuates the LCD panel to convert from the wide viewing angle mode to the narrow viewing angle mode, and when the drive circuit increases or reduces the bias voltage, the display viewing angle of the LCD panel becomes narrower or wider correspondingly; and the bias voltage applied to the first planar transparent electrode is removed when the drive circuit drives the LCD panel to convert from the narrow viewing angle mode to the wide viewing angle mode.

In the LCD, for instance, the LCD comprises a mode selection input key; and the drive circuit conducts the conversion of the wide viewing angle mode or the narrow viewing angle mode according to selection of the mode selection input key, or increases or reduces the visible angle range of the LCD panel in the narrow viewing angle mode.

The LCD provided by the embodiment of the present invention realizes an LCD panel with a simple structure and a changeable display viewing angle by means of the planar transparent electrode in the color filter substrate of the LCD panel and the two layers of strip transparent electrodes in the TFT array substrate, and drives the LCD panel with a drive circuit, and the drive circuit can achieve adjustable viewing angle with the bias voltage applied to the planar transparent electrode in the color filter substrate. Compared with the traditional TN-mode or FFS-mode LCD panel, the LCD does not obviously increase it volume, has a simple production process and reduces the costs of a viewing angle controllable LCD panel.

BRIEF DESCRIPTION OF THE DRAWINGS

Simple description will be given below to the accompanying drawings of the embodiments to provide a more clear understanding of the technical proposals of the embodiments of the present invention. It will be obvious to those skilled in the art that the drawings described below only involve some embodiments of the present invention but are not intended to limit the present invention.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. It will be obvious to those skilled in the art that the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

Unless otherwise specified, the technical or scientific terms used herein have normal meanings understood by those skilled in the art. The words "first", "second" and the like used in the description and the claims of the patent application of the present invention do not indicate the sequence, the number or the importance but are only used for distinguishing different components. Similarly, the words "a", "an" and the like also do not indicate the number but only indicate at least one. The words "connection", "connected" and the like are not limited to physical or mechanical connection but may comprise electrical connection, either directly or indirectly. The words "on", "under", "left", "right" and the like only indicate the relative position relationship which is correspondingly changed when the absolute position of a described object is changed.

Detailed description will be given to the LCD viewing angle control method, the LCD panel and the LCD, provided by the embodiments of the present invention, with reference to the accompanying drawings.

The embodiments of the present invention provide an LCD viewing angle control method, an LCD panel with a changeable display viewing angle, and an LCD based on the principles of TN mode and FFS mode. The principles of the TN mode and the FFS mode are respectively introduced below at first.

Figure 1:
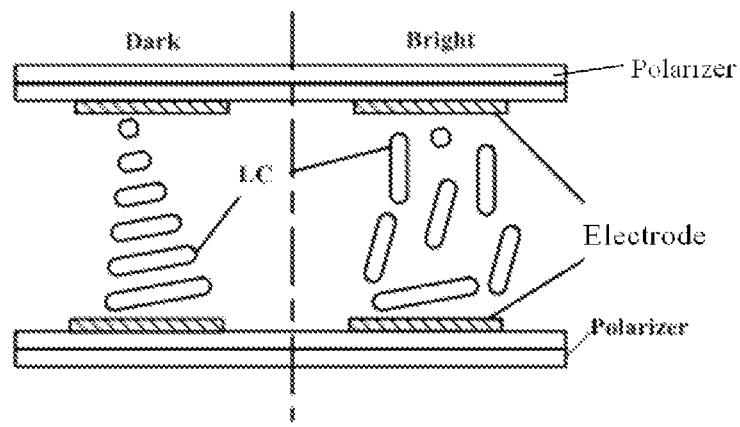
FIG. 1 is a schematic diagram illustrating the TN-mode LCD principle in prior art.

FIG. 1 is a schematic diagram illustrating the TN-mode LCD principle. Liquid crystal materials are disposed between transparent glass substrates to which two polarizers having optical axes perpendicular to each other are attached respectively; electrodes are formed on the glass substrates; liquid crystal molecules are orientated in parallel to the transparent glass substrates when no voltage is applied; alignment films of which the rubbing directions are perpendicular to each other are respectively formed on the inner surfaces of the two transparent glass substrates; and the liquid crystal molecules are rotationally arranged in sequence along the directions of fine grooves of the alignment films. As illustrated in the left side of FIG. 1, the alignment of the liquid crystal molecules is to rotate by 90 degrees from the top down; at this point, if no electrical field is applied, light running through an LCD panel is incident from a polarizer on one side; the polarization direction of the light is rotated by 90 degrees according to the alignment of the liquid crystal molecules, so that the light can be emitted out from a polarizer on the other side; and therefore, the LCD panel at this point is in a bright state. As illustrated in the right side of FIG. 1, if the electrodes on the two glass substrates are electrified, an electric field will be established between the two glass substrates and will affect the alignment of the liquid crystal molecules between the two glass substrates. When the applied voltage is large enough, the liquid crystal molecules are arranged vertically along the electric field; the polarization direction of the light incident from the polarizer on one side will not change after the light runs through the liquid crystal layer, so that the light cannot run through the polarizer on the other side; and therefore, the LCD panel at this point is in a dark state in the case of a voltage applied. The TN-mode LCD panel has low production costs and is widely applied in middle and low-end LCD screens. However, the TN-mode LCD panel realizes the bright state with the vertically arranged liquid crystal molecules; at this point, only the polarization direction of the light emitted in the direction perpendicular to the LCD panel absolutely cannot be deflected by the liquid crystal molecules and the polarization direction of the light in other directions can be deflected to different degrees; and therefore, the light transmittance can be reduced and hence the viewing angle of the TN-mode LCD panel can be limited accordingly. Moreover, the TN-mode LCD panel will suffer the phenomenon of gray-scale inversion at downward angle.

Figure 2:
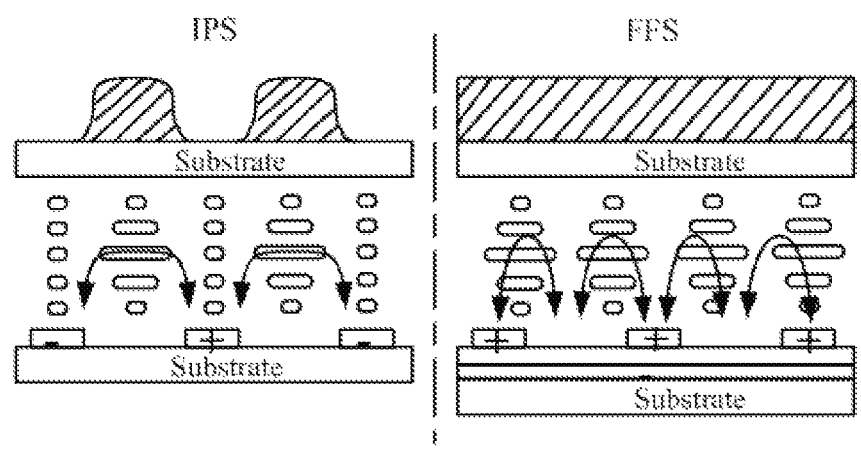
FIG. 2 is a schematic diagram illustrating the FFS-mode LCD principle in prior art.

FFS mode is a kind of display mode developed from in-plane switching (IPS) mode. Both the FFS mode and the IPS mode utilize the fringe field effect to deflect liquid crystal molecules. FIG. 2 is a schematic diagram illustrating the FFS-mode LCD principle.

As illustrated in the left part of FIG. 2, in the IPS mode, a pixel electrode and a common electrode are disposed in a same plane and interleaved with each other. When no voltage is applied between the pixel electrode and the common electrode, the liquid crystal molecules are orientated in a plane parallel to the panel and are parallel to each other; when a voltage is applied, a transverse electric field will be established between the pixel electrode and the common electrode, so that the liquid crystal molecules are deflected by an angle in the horizontal direction; and the liquid crystal molecules in different planes will be deflected to different degrees, so that the polarization state of the light can be changed compared with the case of no electric field applied, and hence the LCD panel is in a bright state. As for the arrangement manner of liquid crystals in the IPS mode, observers can see almost the same cross sections of the liquid crystals even at different angles, that is to say, the brightness of the display screen is almost unchanged no matter the observers see the display screen at any angle. Therefore, the viewing angle of the IPS mode is better than that of the TN mode. But because only the liquid crystal molecules between the positive electrode and the negative electrode (the field intensity of a fringe electric field at this place is stronger and the electric field effect is obvious) can be deflected, the aperture ratio of the IPS-mode LCD panel is low and the light transmittance is also low.

Compared with the IPS mode, the FFS mode changes the arrangement manner of the electrodes. As illustrated in the right part of FIG. 2, a electrode indicated with "−" is a planar electrode, and a electrode indicated with "+" is a strip electrode arranged in a same plane; and the positive electrode and the negative electrode are not arranged at intervals as the IPS mode but are separated from each other through an insulating layer and in an overlap arrangement, so that the width and the spacing of the electrodes can be reduced. Due to the fringe electric field produced by the positive electrode and the negative electrode separated from each other through the insulating layer, all the liquid crystal molecules in alignment between the electrodes and in almost the whole plane over the electrodes can be rotated in the plane (parallel to the substrates), and thus the light transmittance of the liquid crystal layers can be improved, and consequently the FFS mode has a good viewing angle and high light transmittance.

In the schematic diagrams of the IPS mode and the FFS mode in FIG. 2, the dashed area on the upper substrate represents the distribution chart of the light transmittance on the whole LCD panel.

The foregoing illustrates the principles of the TN mode and the FFS mode. The LCD viewing angle control method, the LCD panel and the LCD in the embodiments of the present invention will be described below based on the two modes.

First Embodiment

The first embodiment of the present invention provides an LCD viewing angle control method, applied in an LCD panel. The LCD panel comprises an array substrate and a color filter substrate which are arranged opposite to each other; a pixel unit array (such as an active matrix array) defined by gate lines and data lines is arranged on the array substrate; each pixel unit, for instance, comprises a thin-film transistor (TFT) acting as a switching element; and an array structure of a color filter, defined by a black matrix (not shown), is arranged on the color filter substrate and corresponds to the pixel units on the array substrate.

In addition, a first planar transparent electrode is arranged inside the color filter substrate of the LCD panel, and a second strip transparent electrode is arranged inside the array substrate of the LCD panel. A fringe electric field can be established between the electrodes arranged on the array substrate and the color filter substrate through the first planar transparent electrode and the second strip transparent electrode, and the display viewing angle of the LCD panel can be controlled by the control of the formed fringe electric field.

The array substrate in the embodiment of the present invention is described by taking a TFT array substrate for example. The TFT array substrate comprises electrodes configured to drive liquid crystals and, for instance, may further comprise gate lines, data lines and TFTs acting as switching elements of pixel units. Compared with a vertical electric field formed between the TFT array substrate and the color filter substrate in the TN mode, in the embodiment of the present invention, a fringe electric field is formed between the TFT array substrate and the color filter substrate, so that the LCD panel has better viewing angle. In another aspect, compared with the case that the positive electrodes and the negative electrode are all arranged on the TFT array substrate in the FFS mode, in the embodiment of the present invention, the positive electrode and the negative electrodes forming the fringe electric field are respectively arranged on the TFT array substrate and the color filter substrate, so that the LCD panel not only has good light transmittance but also has a good adjustable viewing angle due to the fringe electric field. Therefore, the embodiment provides a viewing angle control method resulting in a simple production process of the LCD panel.

Figure 3A:
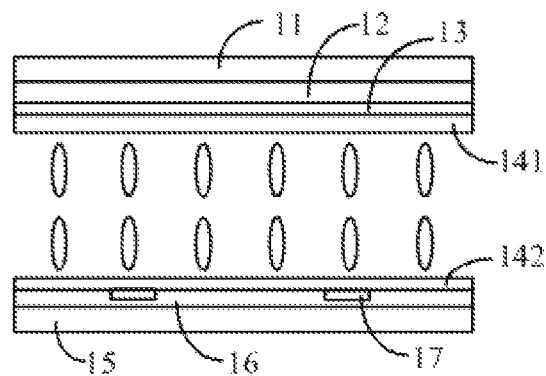
FIGS. 3A and 3B are schematic diagrams of a viewing angle control method provided by a first embodiment of the present invention.

For instance, as illustrated in FIG. 3A, the color filter substrate comprises a first transparent substrate 11, a color filter (CF) 12, a first planar transparent electrode 13 and a first polyimide (PI) alignment film 141 from the top down in order; and the array substrate comprises a second transparent substrate 15, an insulating layer 16, second strip transparent electrode 17 and a second PI alignment film 142 from the bottom up in order.

In the embodiment, the liquid crystal molecules in the liquid crystal layer are vertically orientated relative to the TFT array substrate and the color filter substrate. The liquid crystals are described in the embodiment by taking positive liquid crystals for example, but the present invention is not limited to adoption of positive liquid crystals.

Alignment films, for instance, PI alignment films, are formed on the inner surfaces of the color filter substrate and the array substrate respectively. The alignment films, for instance, are formed with fine grooves by a rubbing process, and these fine grooves have the function of anchoring the liquid crystal molecules or may enable the liquid crystals to be arranged according to an angle between a branched chain and a main chain in PI polymer molecules (i.e., the pre-tilt angle direction). By adoption of vertically aligned PI liquid, the liquid crystal molecules can be vertically aligned in the case of no voltage applied. The angle may be formed between the branched chain and the main chain of the polymer molecules in the PI liquid. Due to the angle, the formed PI film is not a flat film layer but is a film layer in a jagged configuration, and an angle between the jagged portion and the plane is a pre-tilt angle. The liquid crystal molecules can be prearranged in order according to the pre-tilt angle.

The method for controlling the display viewing angle of the LCD panel through the fringe electric field between the first planar transparent electrode 13 and the second strip transparent electrode 17 will be described in detail below.

(1) Dark-State Realization at the Wide Viewing Angle

Figure 3B:
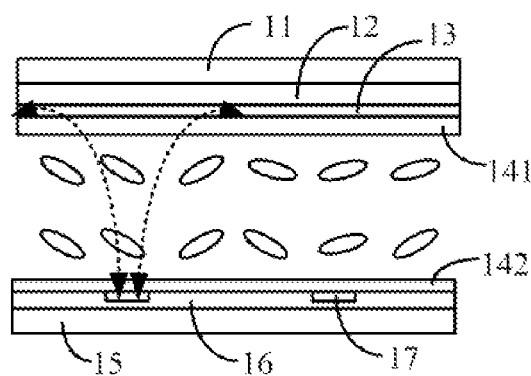

FIGS. 3A and 3B are schematic diagrams of dark-state display and bright-state display in the wide viewing angle mode, provided by the first embodiment of the present invention. As illustrated in FIG. 3A, the liquid crystal molecules in the liquid crystal layer are vertically aligned relative to the substrates in the case of no voltage applied, and the dark state can be obtained by optical compensation through a compensating film. For instance, the directions of the optical axes of the polarizers respectively attached to the color filter substrate and the TFT array substrate are perpendicular to each other. In the case of no voltage applied, the liquid crystal molecules will not change the polarization direction of the light, so the light cannot run through the two polarizers in which the directions of the optical axes are perpendicular to each other, and hence the LCD is in the dark state.

(2) Bright-State Realization at the Wide Viewing Angle

A voltage of 0V is applied to the first planar transparent electrode 13, and a pixel electrode voltage (for instance, +6V to −6V) is applied to the second strip transparent electrode 17. As illustrated in FIG. 3B, due to the fringe field effect of the electric field between the first planar transparent electrode 13 and the second strip transparent electrode 17, the direction of the liquid crystal molecules is deflected, that is, deflected from the vertical direction to the horizontal direction. Compared with the liquid crystal molecules before being deflected, the polarization direction of the light is changed by the deflected liquid crystal molecules, so the light can run through the LCD panel, and hence the bright state can be achieved. As illustrated in FIG. 3B, the dotted line illustrates the schematic diagram of the fringe electric field established between the first planar transparent electrode 13 and the second strip transparent electrode 17. Due to the fringe electric filed, the direction of the liquid crystal molecules can be deflected. The direction as illustrated in the figure is only for illustration, and the fringe electric field produced in practice is more complex and is not limited to the case as illustrated in the figure. The fringe electric field can be simulated by calculation through software. As the light in various directions can be compensated to certain degree due to the fringe field effect, the light emitted from the LCD panel can maintain certain brightness (the emergent light not only has greater intensity in the vertical direction), and hence the wide viewing angle can be achieved.

The fringe electric field is not a uniform electric field and does not act as the vertical electric field in the TN mode, in which the size and the direction of the electric field in the whole liquid crystal layer are identical. As for the fringe electric field, the produced fringe electric field is different according to the difference of the distribution of the electrodes and the difference of the magnitude of the applied voltages. In addition, the magnitude and the direction of the electric filed at different positions in the fringe electric field are also different. Therefore, the deflected liquid crystal molecules are not completely parallel to each other, and the deflected liquid crystal molecules in different planes and at different positions have different horizontal degrees. By the selection of an appropriate voltage range, due to the fringe electric field, the deflection of the liquid crystal molecules in the liquid crystal layer entirely provides good polarization compensation to the light running therethrough.

The implementation principles of the bright state and the dark state in the wide viewing angle mode have been described with the above examples. The implementation principles of the bright state and the dark state in the narrow viewing angle mode will be described below. By the application of a bias voltage to the first planar transparent electrode of the color filter substrate, the LCD panel has light leakage in the dark state, so that the display viewing angle of the LCD panel can become narrower. Moreover, the display viewing angle of the LCD panel can be adjusted by the adjustment of the bias voltage. The viewing angle of the LCD panel can be divided into a horizontal viewing angle and a vertical viewing angle, in which the horizontal view angle refers to the angle range of an image can be viewed clearly in moving between the left side and the right side by taking the vertical central axis of the LCD panel as the center; and the vertical angle refers to the angle range of an image can be viewed clearly by moving up and down by taking a horizontal central axis of the LCD panel as the center. The range of the viewing angle may be affected by brightness and contrast ratio of the bright state and the dark state. When the viewing angle is widened, the contrast ratio between the bright state and the dark state will be reduced. When the viewing angle is widened to a certain degree and the contrast ratio is reduced in such a way that the image cannot be viewed clearly any more, this viewing angle is called as the maximum visible angle, and the visible range will be exceeded when a viewing angle is more than the maximum visible angle. In the case of light leakage in the dark state, the visible range of the LCD screen can be reduced. Therefore, the formed fringe electric field can be changed by the adjustment of the bias voltage, and the alignment of the liquid crystal molecules near the second strip transparent electrode on the array substrate can be controlled, and thus the light leakage degree in the dark state can be controlled, and consequently an adjustable viewing angle can be achieved. Detailed description will be given below.

(3) Dark-State Realization at the Narrow Viewing Angle

Figure 4A:
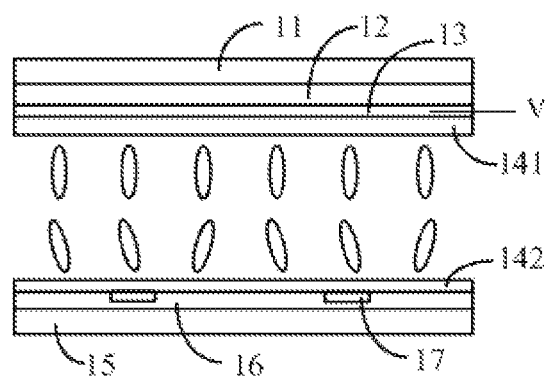
FIGS. 4A and 4B are schematic structural views of an LCD panel provided by a second embodiment of the present invention.

FIG. 4A is a schematic diagram of dark-state display and bright-state display in the narrow viewing angle mode, provided by the first embodiment of the present invention.

A bias voltage is applied to the first planar transparent electrode 13. For instance, the bias voltage may be an adjustable voltage of 2-5V. For instance, a bias voltage of 3V is applied to the first planar transparent electrode 13. In addition, the pixel electrode voltage of 0V is applied to the second strip transparent electrode 17. As illustrated in FIG. 4A, due to the bias voltage applied to the first planar transparent electrode 13, the second strip transparent electrode 17 become a conductor in the bias electric field produced by the first planar transparent electrode 13 and is then polarized. Due to the electric filed produced by polarization, the liquid crystal molecules near the strip electrodes are deflected and obliquely aligned. At this point, the alignment of the liquid crystal molecules is between the vertical and horizontal direction, so that the direction of the light can be deflected to a certain degree, and hence the phenomenon of light leakage to a certain degree can occur at this point.

As for the LCD panel, as the viewing angle is widened, the contrast ratio between the bright state and the dark state can be reduced. When the contrast ratio is reduced to a certain degree and the image cannot be clearly viewed, the viewing angle at this point exceeds the visible angle range. Therefore, in the case of light leakage in the dark state, the visible angle range of the LCD screen becomes narrow. In the embodiment, the alignment of the liquid crystal molecules near the second strip transparent electrode 17 can be controlled by the adjustment of the bias voltage, and hence the light leakage degree in the dark state can be controlled, and consequently the adjustable viewing angle can be achieved.

(4) Bright-State Realization at the Narrow Viewing Angle

Figure 4B:
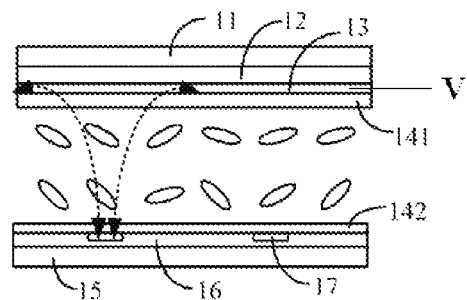

A bias voltage is applied to the first planar transparent electrode 13. For instance, the bias voltage may be an adjustable voltage of 2V-5V. In addition, the pixel electrode voltage is applied to the second strip transparent electrode 17. As illustrated in FIG. 4B, a fringe electric field is produced between the first planar transparent electrode 13 and the second strip transparent electrode 17. Due to the composite effect of the acting force produced by the fringe electric field and the acting force of the alignment films to the liquid crystal molecules, the direction of the liquid crystal molecules can be changed, and hence the bright-state display can be achieved. Meanwhile, due to the bias voltage, the display viewing angle of the LCD panel is smaller compared to the case that the voltage of 0V is applied to the first planar transparent electrode 13. The formed fringe electric field can be changed by the adjustment of the bias voltage, and the deflection degree of the liquid crystal molecules can be changed, so that the function of changing the viewing angle of the LCD panel can be achieved.

As illustrated in Table 1, the voltages respectively applied to various electrodes at the wide viewing angle and the narrow viewing angle based on the above structure is described.

TABLE 1

Description on Voltages Applied to Electrodes

| | First planar transparent electrode | Second strip transparent electrode |
|---|---|---|
| Dark-state at the wide viewing angle | No voltage applied | No voltage applied |
| Bright-state at the wide viewing angle | 0 V | Pixel electrode voltage |
| Dark-state at the narrow viewing angle | Bias voltage (V) | 0 V |
| Bright-state at the narrow viewing angle | Bias voltage (V) | Pixel electrode voltage |

In the embodiment, the display viewing angle of the LCD panel can be controlled by the control of the bias voltage applied to the first planar transparent electrode 13. The control of the bias voltage applied to the first planar transparent electrode 13 is, for instance, as follows: when the LCD panel conducts image display in the wide viewing angle mode, the voltage of 0V is applied to the first planar transparent electrode 13; and when the LCD panel conducts image display in the narrow viewing angle mode, the bias voltage of more than 0V is applied to the first planar transparent electrode 13. The display viewing angle of the LCD panel becomes narrower as the bias voltage is increased. In addition, the pixel electrode voltage is applied to the second strip transparent electrode. In general, the range of the bias voltage is less than that of the pixel electrode voltage. For instance, when the range of the pixel electrode voltage is between −6V and +6V, the range of the bias voltage may be between 2V and 5V. The range of the pixel electrode voltage is different in view of different types of the liquid crystal molecules and the LCD panel, and the corresponding bias voltage is also different.

Figure 5:
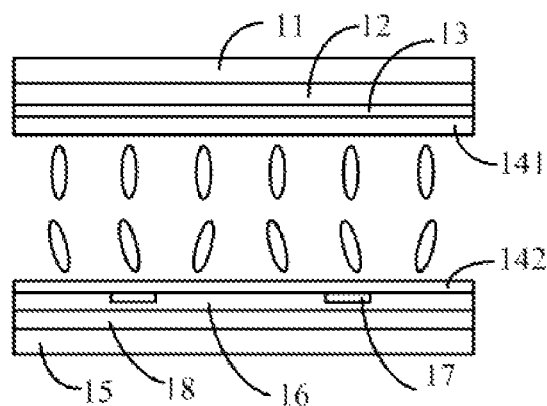
FIG. 5 is a schematic diagram illustrating the wide-viewing-angle bright-state realization provided by the second embodiment of the present invention.

Preferably, as illustrated in FIG. 5, a fourth planar transparent electrode 18 is also arranged on the second transparent substrate 15 of the TFT array substrate, and an insulating layer 16 is arranged between the fourth planar transparent electrode 18 and the second strip transparent electrode 17. The function of the fourth planar transparent electrode is that: when the liquid crystal molecules are required to restore from a bright state to a dark state, a short-time voltage is applied for a predetermined duration to the fourth planar transparent electrode 18, so that the liquid crystal molecules can be quickly restored to the vertical state. For instance, the voltage of 0V may be applied to the fourth planar transparent electrode 18. Or, no voltage is applied to the fourth planar transparent electrode 18 when the bias voltage is applied to the first planar transparent electrode 13. When the LCD is restored from the bright state to the dark state, the short-time voltage is applied to the fourth planar transparent electrode 18 for the predetermined duration, for instance, the voltage of 10V for 0.5 ms. The short-time voltage may be more than the maximum pixel electrode voltage, so that the liquid crystal molecules can be quickly restored to the vertical state.

Second Embodiment

Two layers of strip transparent electrodes can be arranged inside the TFT array substrate for better utilization of the fringe field effect, so that the cross sections of the liquid crystal molecules in various directions can be same, and hence the light in various directions can be uniformly compensated and consequently the aperture ratio and the light transmittance of the whole LCD panel can be improved. The viewing angle of the LCD panel is controlled according to the fringe electric field formed between the two layers of strip transparent electrodes and the planar transparent electrode arranged inside the color filter substrate.

The cross sections of the liquid crystal molecules refer to the cross sections of rod-shaped liquid crystals. Typically, the case where the cross sections of the liquid crystal molecules are the same refers to that where the semi-axis lengths Nx and Ny in the X and Y directions are the same.

Figure 6A:
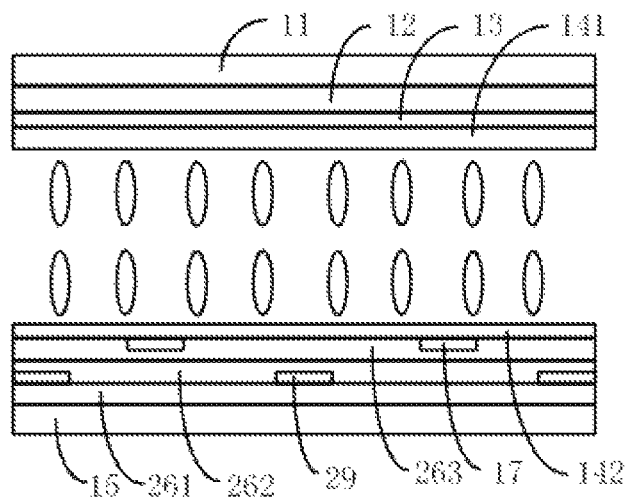
FIGS. 6A and 6B are schematic diagrams illustrating the narrow-viewing-angle dark-state realization provided by the second embodiment of the present invention.

The second embodiment provides an LCD viewing angle control method. Electrodes are arranged on the TFT array substrate and the color filter substrate for forming a fringe electric field. For instance, a first planar transparent electrode is arranged inside the color filter substrate of the LCD panel, and a second strip transparent electrode and a third strip transparent electrode are arranged inside the TFT array substrate of the LCD panel, so that the fringe electric field can be formed after the power source is connected, and hence the fringe electric field can be controlled to adjust the display viewing angle of the LCD panel. As illustrated in FIG. 6A, a liquid crystal layer is arranged between the color filter substrate and the array substrate. As similar to the above embodiment, positive liquid crystals in the liquid crystal layer are arranged perpendicular to the surfaces of the substrates (i.e., the horizontal plane in the figure) when no voltage is applied to the electrodes.

The array substrate in the embodiment of the present invention is also illustrated by taking a TFT array substrate for example. The TFT array substrate not only comprises the electrodes configured to drive the liquid crystals but also, for instance, comprises gate lines, data lines and TFTs acting as switching elements of pixel units.

The color filter substrate comprises a first transparent substrate 11, a color filter 12, a first planar transparent electrode 13 and a first PI alignment film 141 from the top down in order; and the array substrate comprises a second transparent substrate 15, a first insulating layer 261, a third strip transparent electrode 29, a second insulating layer 262, a third insulating layer 263, a second strip transparent electrode 17 and a second PI alignment film 142 from the bottom up in order, in which the second strip transparent electrode 17 and the third strip transparent electrode 29 are interleaved in the horizontal direction.

The implementation principles of the wide viewing angle by respectively applying the voltage to the four layers of electrodes, in the embodiment of the present invention, will be described in detail below.

(1) Dark-State Realization at the Wide Viewing Angle

FIG. 6A is a schematic diagram of realization of the dark-state and the bright-state at the wide viewing angle. As illustrated in FIG. 6A, the liquid crystal molecules are vertically aligned, and the dark state can be obtained by optical compensation through a compensating film in the case of no voltage applied. For instance, the directions of optical axes of polarizers on the first transparent substrate 11 and the second transparent substrate 15 are perpendicular to each other. In the case of no voltage applied, the liquid crystal molecules do not change the polarization direction of the light, so that the light cannot run through the two polarizers, of which the directions of the optical axes are perpendicular to each other, and hence the LCD is in the dark state.

(2) Bright-State Realization at the Wide Viewing Angle

Figure 6B:
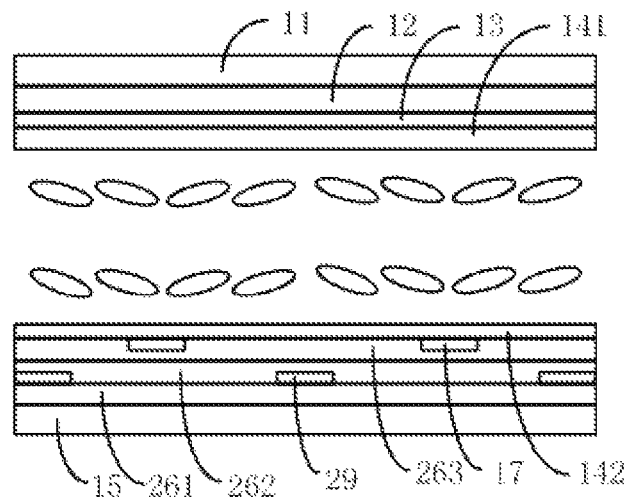

FIG. 6B is a schematic diagram of realization of the bright-state at the wide viewing angle. As illustrated in the figure, the voltage of 0V is applied to the first planar transparent electrode 13, and different operating voltages are respectively applied to the second strip transparent electrode 17 and the third strip transparent electrode 29. The pixel electrode voltage (+6V to −6V) is applied to the second strip transparent electrode 17; and the common electrode voltage of 0V is applied to the third strip transparent electrode 29. At this point, the electric field around the liquid crystal molecules is the result of the overlapping of a plurality of electric fields. Due to the composite effect of the acting force produced by the overlapped electric field and the acting force of the alignment film to the liquid crystal molecules, the direction of the liquid crystal molecules can be changed and a new balanced state can be achieved. The produced electric fields at least comprise an electric field E11 between the first planar transparent electrode 13 and the second strip transparent electrode 17, an electric field E12 between the second strip transparent electrode 17 and the third strip transparent electrode 29, and an electric field E13 between the first planar transparent electrode 13 and the third strip transparent electrode 29. The effect of the electric fields E12 and E13 on the deflecting of the liquid crystal molecules is small. The direction of the liquid crystal molecules is deflected mainly due to the fringe field effect of the electric field E11 between the first planar transparent electrode 13 and the second strip transparent electrode 17. Moreover, the deflected liquid crystal molecules change the polarization direction of the light, so that the bright-state realization can be achieved. Due to the fringe field effect, the light in various directions can be compensated to a certain degree, and hence the wide viewing angle can be achieved.

The foregoing illustrates the realization of the bright state and the dark state at the wide viewing angle. The bright state and the dark state at the narrow viewing angle will be described below based on the same structure.

(3) Dark-State Realization at the Narrow Viewing Angle

Figure 7A:
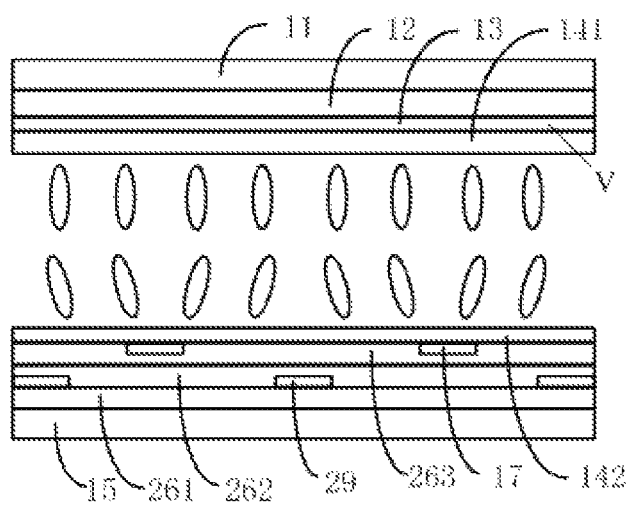
FIGS. 7A and 7B a schematic diagrams illustrating the narrow-viewing-angle bright-state realization provided by the second embodiment of the present invention.

FIG. 7A is a schematic diagram of the realization of the dark state at the narrow viewing angle. As illustrated in FIG. 7A, a bias voltage is applied to the first planar transparent electrode 13. For instance, the bias voltage may be an adjustable voltage of 2V-5V. For instance, a bias voltage of 3V is applied to the first planar transparent electrode 13. In addition, the voltage of 0V is respectively applied to the second strip transparent electrode 17 and the third strip transparent electrode 29. Due to the presence of the bias voltage of the first planar transparent electrode 13, the second strip transparent electrode 17 and the third strip transparent electrode 29 become conductors in the bias electric field of the first planar transparent electrode 13 and are then polarized. Due to the electric field produced by polarization, the liquid crystal molecules near the second strip transparent electrode 17 and the third strip transparent electrode 29 can be deflected and obliquely aligned, and hence the direction of the light can be deflected to a certain degree, and consequently the phenomenon of light leakage to a certain degree can occur.

(4) Bright-State Realization at the Narrow Viewing Angle

Figure 7B:
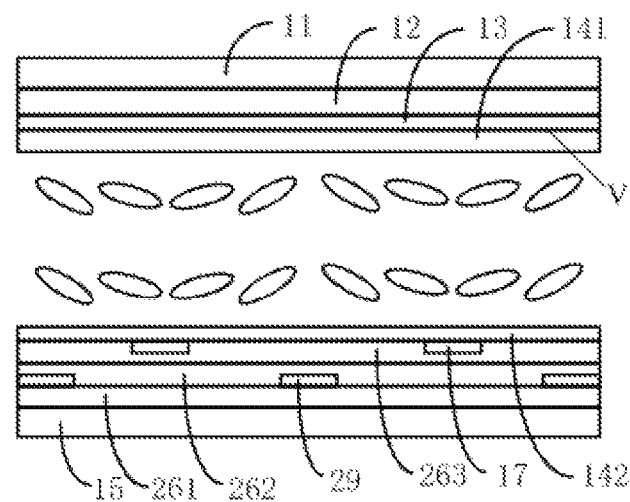

FIG. 7B is a schematic diagram of the realization of the bright-state at the narrow viewing angle. Similarly, the bias voltage is applied to the first planar transparent electrode 13. For instance, the bias voltage may be an adjustable voltage of 2V-5V. In addition, the pixel electrode voltage is applied to the second strip transparent electrode 17, and the common electrode voltage of 0V is applied to the third strip transparent electrode 29.

At this point, the electric field around the liquid crystal molecules is the result of the overlapping of a plurality of electric fields. The electric fields at least comprise an electric field E21 between the first planar transparent electrode 13 and the second strip transparent electrode 17, an electric field E22 between the first planar transparent electrode 13 and the third strip transparent electrode 29, and an electric field E23 between the second strip transparent electrode 17 and the third strip transparent electrode 29. Due to the composite effect of the acting force produced by the overlapped electric field and the acting force of the alignment film to the liquid crystal molecules, the direction of the liquid crystal molecules can be changed and a new balanced state can be achieved. Due to the fringe field effect of the electric field, the liquid crystal molecules can be obliquely aligned, and hence the polarization direction of the light can be changed, and consequently the bright-state can be achieved. Due to the fringe field effect, the light in various directions can be compensated to a certain degree, and hence the wide viewing angle can be achieved. The formed fringe electric field can be changed by the adjustment of the bias voltage, and hence the deflecting degree of the liquid crystal molecules can be changed, and consequently the function of changing the viewing angle of the LCD panel can be achieved.

As illustrated in Table 2, the voltage respectively applied to various electrodes producing the fringe electric field in realization of the wide viewing angle and the narrow viewing angle is described.

TABLE 2

Description on Voltage Applied to Electrodes

| | First planar transparent electrode | Second strip transparent electrode | Third strip transparent electrode |
|---|---|---|---|
| Dark-state at the wide viewing angle | No voltage applied | No voltage applied | No voltage applied |
| Bright-state at the wide viewing angle | 0 V | Pixel electrode voltage | Common electrode voltage |
| Dark-state at the narrow viewing angle | Bias voltage (V) | 0 V | Common electrode voltage |
| Bright-state at the narrow viewing angle | Bias voltage (V) | Pixel electrode voltage | Common electrode voltage |

Figure 8:
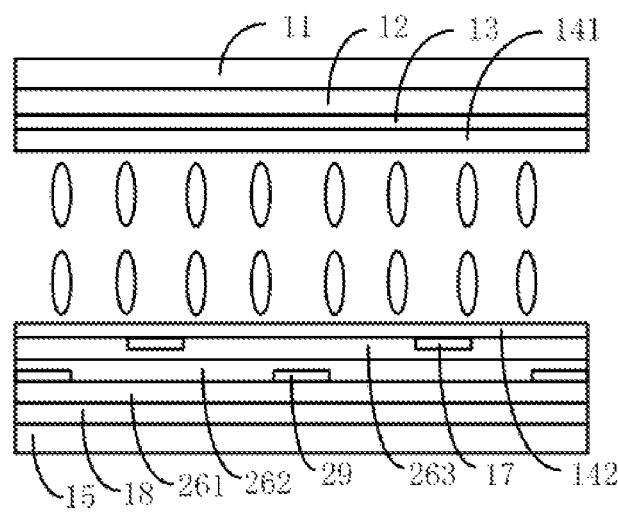
FIG. 8 is a schematic diagram of another embodiment of the present invention.

Preferably, as illustrated in FIG. 8, a fourth planar transparent electrode 18 is also arranged on the second transparent substrate 15 of the TFT array substrate, and an insulating layer 261 is arranged between the fourth planar transparent electrode 18 and the third strip transparent electrode 29. The function of the fourth planar transparent electrode 18 is that: when the liquid crystal molecules are required to restore from a bright state to a dark state, a short-time voltage is applied for a predetermined duration to the fourth planar transparent electrode 18, so that the liquid crystal molecules can be quickly restored to the vertical state. In other cases, the voltage of 0V or no voltage can be applied to the fourth planar transparent electrode 18. The short-time voltage may, for instance, be a voltage of 10V for 0.5 ms. Moreover, the short-time voltage is more than the maximum pixel electrode voltage, so that the liquid crystal molecules can be quickly restored to the vertical state.

Third Embodiment

The third embodiment of the present invention provides an LCD panel capable of changing the display viewing angle based on the principles which are identical or similar to those methods of the above embodiments. The structure of the LCD panel is identical or similar to that of the LCD panel as illustrated in FIGS. 3 to 8. Based on the identical or similar principles, the LCD panel can achieve the function of adjusting the display viewing angle.

Figure 9:
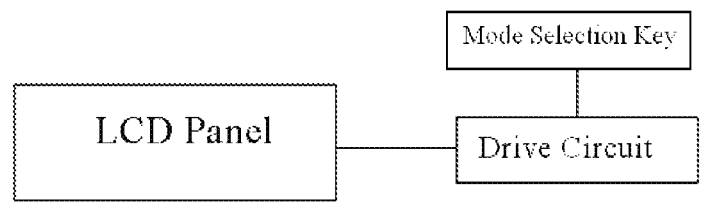
FIG. 9 is a schematic diagram of a liquid crystal display provided by an embodiment of the present application.

The embodiment of the present invention further provides an LCD, as shown in FIG. 9, which comprises the LCD panel in any of the above embodiments. Moreover, the LCD may further comprise a drive circuit if required, wherein the drive circuit is configured to drive the LCD panel in display. Based on the identical or similar principles of the above embodiments of the LCD panel, the drive circuit can apply corresponding voltages to various transparent electrodes according to the setting of the visible angle. In addition, the drive circuit can control the mutual conversion between the wide viewing angle mode and the narrow viewing angle mode according to a predetermined condition. When the drive circuit converts the LCD panel from the wide viewing angle mode to the narrow viewing angle mode, the bias voltage is applied to the first planar transparent electrode 13 of the LCD panel; and when the drive circuit converts the LCD panel from the narrow viewing angle mode to the wide viewing angle mode, the bias voltage applied to the first planar transparent electrode 13 is set to be voltage of 0V.

A mode selection input key may be provided on a controller of the LCD panel and is configured to control the viewing angle of the LCD panel. The mode selection input key may be a switching button and is provided for a user for controlling the conversion between the wide viewing angle mode and the narrow viewing angle mode. When the selection result of the switching button is the wide viewing angle mode, the drive circuit applies the bias voltage of 0V to the first planar transparent electrode 13; and when the selection result of the switching button is the narrow viewing angle mode, the drive circuit applies the bias voltage of 2V-5V to the first planar transparent electrode 13. Moreover, the mode selection input key may also be a knob which is provided for the user for adjusting the viewing angle. The drive circuit adjusts the bias voltage by the input of the knob. The more the bias voltage applied to the first planar transparent electrode 13, the narrower the viewing angle of the LCD panel.

In the LCD provided by the embodiment of the present invention, an LCD panel with a simple structure and a changeable display viewing angle is achieved through the planar transparent electrode in the color filter substrate and the strip transparent electrode(s) in the array substrate of the LCD panel. In addition, the drive circuit is configured to drive the LCD panel and achieves an adjustable viewing angle with the bias voltage applied to the planar transparent electrode in the color filter substrate. Compared with the conventional TN-mode or FFS-mode LCD panel, the LCD has the advantages of not obviously increasing the volume, having a simple production process and reducing the costs of the LCD panel with a controllable viewing angle.

An embodiment of the present invention further provides a method for manufacturing the LCD panel. The method comprises the manufacturing of the array substrate and the manufacturing of the color filter substrate, which are respectively illustrated below. The array substrate, for instance, may be a TFT array substrate. The TFT array substrate not only comprises electrodes configured to drive liquid crystals but also, for instance, comprises gate lines, data lines and TFTs taken as switching elements of pixel units.

The embodiment of the manufacturing of the array substrate comprises the following steps of:

step 10: forming a pattern of a fourth planar transparent electrode on the transparent substrate for the array substrate;

step 11: preparing a gate line and a gate electrode, wherein a gate line electrode layer is formed by deposition, and the gate line and the gate electrode are formed by photolithography and etching processes;

step 12: preparing a first insulating layer after completing the step 11 and depositing the third strip transparent electrode on the first insulating layer, wherein the third strip transparent electrode are formed by photolithography and etching processes and the like;

step 13: preparing a second insulating layer after completing the step 12;

step 14: preparing a third insulating layer after completing the step 13, wherein a connecting holes for a source-drain electrode is formed by photolithography and etching processes; and step 15: depositing a second strip transparent electrode on the substrate after completing the step 14, wherein the second strip transparent electrode is a pixel electrode, and the second strip transparent electrode and a connecting line of a third strip transparent electrode and the source-drain electrode are formed by photolithography and etching processes. Other structures (e.g. the gate line, the data line and the like) on the TFT array substrate, for instance, may be prepared by a known method and will not be further described herein.

The embodiment of the manufacturing of the color filter substrate comprises the following steps of:

step 21: forming a color filter on the transparent substrate of the color filter substrate;

step 22: depositing a first planar transparent electrode after completing the step 21, wherein the first planar transparent electrode is formed by the photolithography and etching processes and the like; and step 23: preparing a liquid crystal alignment resin layer after completing the step 22.

Among others, the manufacturing processes of the color filter substrate are the same with the manufacturing processes of the color filter substrate in the TN mode.

The step 10 in the manufacturing of the TFT array substrate is optional. When the array substrate only has the structure of two layers of electrodes, namely the second strip transparent electrode and the third strip transparent electrode, the step 10 can be omitted and the gate line and the gate electrode are directly prepared on the transparent substrate of the array substrate.

Compared with the traditional FFS mode, the manufacturing of the array substrate and the color filter substrate is as follows: the manufacturing of the color filter substrate further comprises the step of depositing one layer of planar transparent electrode. Compared with the traditional TN mode, the manufacturing of the array substrate and the color filter substrate is as follows: the electrode on the array substrate is a strip electrode; due to the fringe field effect of the strip electrode and the planar electrode on the color, filter substrate, the liquid crystal molecules can be deflected; and due to the bias voltage applied to the planar electrode of the color filter substrate, the adjustable viewing angle of the LCD panel can be achieved.

Various modifications and improvements can be made by those skilled in the art without departing from the spirit and essence of the present invention and should all fall within the scope of protection of the present invention.

The invention claimed is:

1. A liquid crystal display (LCD) viewing angle control method, applied in an LCD panel comprising an array substrate and a color filter substrate arranged opposite to each other, a liquid crystal layer, and alignment films formed on the array substrates and the color filter substrate and contacting liquid crystal molecules in the liquid crystal layer, the alignment films being configured to vertically align the liquid crystal molecules upon no voltage is applied, a first planar transparent electrode being arranged in the color filter substrate of the LCD panel and a second strip transparent electrode being arranged in the array substrate of the LCD panel, the method comprising:

forming an electric field between the array substrate and the color filter substrate through the first planar transparent electrode and the second strip transparent electrode; and controlling a display viewing angle of the LCD panel by controlling the formed electric field, wherein no voltage is applied to the first planar transparent electrode in a dark-state of a wide viewing angle mode while a voltage of 0V is applied to the first planar transparent electrode in a bright-state of the wide viewing angle mode, and a bias voltage of 2-5 V is applied to the first planar transparent electrode in a dark-state of a narrow viewing angle mode and a bright-state of the narrow viewing angle mode and the bias voltage is adjusted to adjust the display viewing angle of the narrow viewing angle mode of the LCD panel, in which the display viewing angle of the LCD panel becomes narrower as the bias voltage is increased.

2. The method according to claim 1, wherein a pixel electrode voltage is applied to the second strip transparent electrode.

3. The method according to claim 1, wherein a third strip transparent electrode is further arranged between a transparent substrate of the array substrate and the second strip transparent electrode, and an insulating layer is arranged between the second strip transparent electrode and the third strip transparent electrode.

4. The method according to claim 3, wherein a pixel electrode voltage is applied to the second strip transparent electrode, and a common electrode voltage is applied to the third strip transparent electrode; and
controlling of the display viewing angle of the LCD panel by controlling the formed electric field further comprises: applying the bias voltage to the first planar transparent electrode and adjusting the display viewing angle of the LCD panel by adjusting the bias voltage, wherein the display viewing angle of the LCD panel becomes narrower as the bias voltage is increased.

5. The method according to claim 3, wherein a fourth planar transparent electrode is further arranged between the transparent substrate of the array substrate and the third strip transparent electrode, and an insulating layer is arranged between the fourth planar transparent electrode and the third strip transparent electrode, and
wherein when the LCD panel is restored from a bright state to a dark state, a short-time voltage is applied for a predetermined duration to the fourth planar transparent electrode to make liquid crystal molecules quickly restored to a vertical state, otherwise a voltage of 0V or no voltage is applied to the fourth planar transparent electrode.

6. A liquid crystal display (LCD) viewing angle control method, applied in an LCD panel comprising an array substrate and a color filter substrate arranged opposite to each other, a liquid crystal layer, and alignment films formed on the array substrates and the color filter substrate and contacting liquid crystal molecules in the liquid crystal layer, the alignment films being configured to vertically align the liquid crystal molecules upon no voltage is applied, a first planar transparent electrode being arranged in the color filter substrate of the LCD panel and a second strip transparent electrode being arranged in the array substrate of the LCD panel, the method comprising:
forming an electric field between the array substrate and the color filter substrate through the first planar transparent electrode and the second strip transparent electrode; and
controlling a display viewing angle of the LCD panel by controlling the formed electric field, wherein no voltage is applied to the first planar transparent electrode in a dark-state of a wide viewing angle mode while a voltage of 0V is applied to the first planar transparent electrode in a bright-state of the wide viewing angle mode, and a bias voltage is applied to the first planar transparent electrode in a dark-state of a narrow viewing angle mode and a bright-state of the narrow viewing angle mode and the bias voltage of 2-5 V is adjusted to adjust the display viewing angle of the narrow viewing angle mode of the LCD panel, in which the display viewing angle of the LCD panel becomes narrower as the bias voltage is increased;
wherein a fourth planar transparent electrode is further arranged between a transparent substrate of the array substrate and the second strip transparent electrode; and
an insulating layer is arranged between the fourth planar transparent electrode and the second strip transparent electrode, and
wherein when the LCD panel is restored from a bright state to a dark state, a short-time voltage is applied for a predetermined duration to the fourth planar transparent electrode to make liquid crystal molecules quickly restored to a vertical state, otherwise a voltage of 0V or no voltage is applied to the fourth planar transparent electrode.

7. A liquid crystal display (LCD) panel, comprising an array substrate and a color filter substrate arranged opposite to each other, a liquid crystal layer, and alignment films formed on the array substrates and the color filter substrate and contacting liquid crystal molecules in the liquid crystal layer, the alignment films being configured to vertically align the liquid crystal molecules upon no voltage is applied, wherein
the color filter substrate comprises a first transparent substrate and a color filter formed on the first transparent substrate; and the array substrate comprises a second transparent substrate;
a first planar transparent electrode is arranged on the color filter of the color filter substrate; and
a second strip transparent electrode is arranged on the second transparent substrate of the array substrate;
wherein the second strip transparent electrode is configured to apply a pixel electrode voltage and the first planar transparent electrode is configured to apply a bias voltage of 2-5 V, so that the LCD panel achieves image display at different visible angle ranges under control of the bias voltage; and
wherein the first planar transparent electrode is applied with no voltage in a dark-state of a wide viewing angle mode while the first planar transparent electrode is applied with a voltage of 0V in a bright-state of the wide viewing angle mode, and the first planar transparent electrode is applied with the bias voltage in a dark-state of a narrow viewing angle mode and a bright-state of the narrow viewing angle mode and the bias voltage is capable of being adjusted to adjust the display viewing angle of the narrow viewing angle mode of the LCD panel, in which the display viewing angle of the LCD panel becomes narrower as the bias voltage is increased.

8. The LCD panel according to claim 7, wherein a liquid crystal layer is arranged between the array substrate and the color filter substrate; and liquid crystals in the liquid crystal layer are positive liquid crystals that are vertically arranged in the case of no voltage applied.

9. The LCD panel according to claim 7, wherein a third strip transparent electrode is further arranged between the second strip transparent electrode and the second transparent substrate of the array substrate; the second strip transparent electrode and the third strip transparent are arranged in an interleave manner and isolated by an insulating layer; and the third strip transparent electrode is configured to apply a common electrode voltage.

10. The LCD panel according to claim 9, wherein a fourth planar transparent electrode is further arranged between the second transparent substrate and the third strip transparent electrode; and an insulating layer is arranged between the fourth planar transparent electrode and the third strip transparent electrode, and
wherein when the LCD panel is restored from a bright state to a dark state, a short-time voltage is applied for a predetermined duration to the fourth planar transparent electrode to make liquid crystal molecules quickly restored to a vertical state, otherwise a voltage of 0V or no voltage is applied to the fourth planar transparent electrode.

11. The LCD panel according to claim 7, wherein a fourth planar transparent electrode is further arranged between the second transparent substrate and the second strip transparent electrode; and an insulating layer is arranged between the fourth planar transparent electrode and the second strip transparent electrode, and
wherein when the LCD panel is restored from a bright state to a dark state, a short-time voltage is applied for a predetermined duration to the fourth planar transparent electrode to make liquid crystal molecules quickly restored to a vertical state, otherwise a voltage of 0V or no voltage is applied to the fourth planar transparent electrode.

12. A liquid crystal display (LCD), comprising the LCD panel according to claim 7 and a drive circuit configured to drive the LCD panel in display.

13. The LCD according to claim 12, wherein the drive circuit is further configured to control the bias voltage applied to the first planar transparent electrode according to a predetermined condition, so as to control a mutual conversion of the LCD panel between the wide viewing angle mode and the narrow viewing angle mode.

14. The LCD according to claim 13, wherein when the drive circuit drives the LCD panel to convert from the wide viewing angle mode to the narrow viewing angle mode, the bias voltage is applied to the first planar transparent electrode of the LCD panel, and when the drive circuit increases or reduces the bias voltage, the display viewing angle of the LCD panel becomes narrower or wider correspondingly; and
when the drive circuit drives the LCD panel to convert from the narrow viewing angle mode to the wide viewing angle mode, the bias voltage applied to the first planar transparent electrode is removed.

15. The LCD according to claim 13, wherein the LCD comprises a mode selection input key; and the drive circuit conducts conversion of the wide viewing angle mode or the narrow viewing angle mode according to selection of the mode selection input key, or increases or reduces the visible angle range of the LCD panel in the narrow viewing angle mode.

* * * * *

UNITED STATES PATENT AND TRADEMARK OFFICE
CERTIFICATE OF CORRECTION

| | |
|---|---|
| PATENT NO. | : 9,618,779 B2 |
| APPLICATION NO. | : 14/123609 |
| DATED | : April 11, 2017 |
| INVENTOR(S) | : Xiaoling Xu |

It is certified that error appears in the above-identified patent and that said Letters Patent is hereby corrected as shown below:

On the Title Page

Item (22) PCT filing date is amended from:
"Nov. 16, 2012"
To:
"Nov. 6, 2012".

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*